United States Patent Office 3,075,333
Patented Jan. 29, 1963

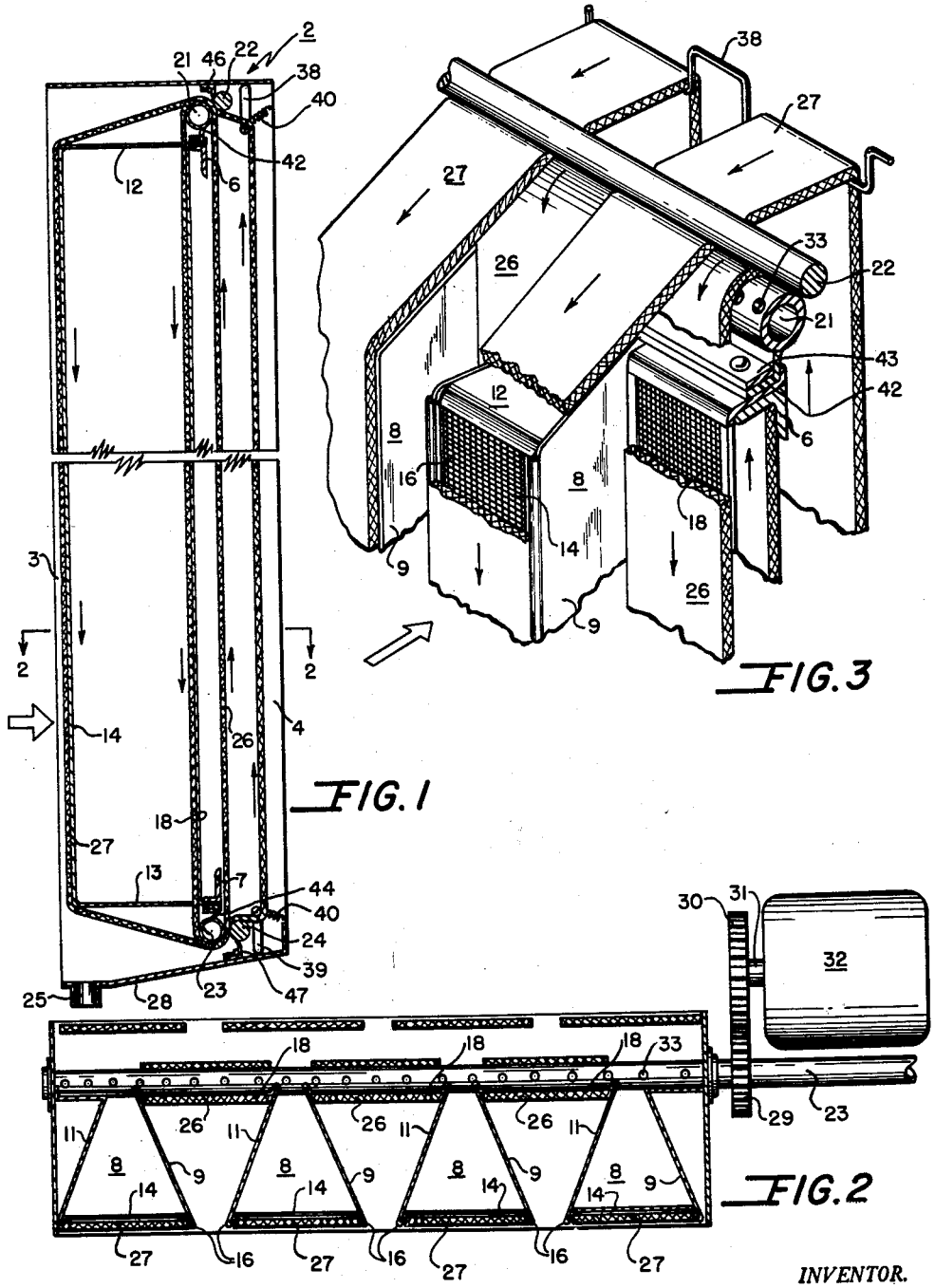

3,075,333
DUST SEPARATOR APPARATUS
Alan E. Revell, Jeffersontown, Ky., assignor to American Air Filter Company, Inc., Louisville, Ky., a corporation of Delaware
Filed Aug. 11, 1960, Ser. No. 48,866
19 Claims. (Cl. 55—233)

The present invention relates to dust filter apparatus, and more particularly to dust filter apparatus of the type employing a moving endless belt of filter medium which moves across the path of a gas flow stream to be treated.

In accordance with the present invention, a dust filter is provided which presents a maximum of clean filtering area to a gas stream to be treated, the filtering area presented requiring a minimum of space and offering a minimum of resistance to the treated stream. In addition, the present invention provides a filter apparatus which affords a readily renewable filter medium, the apparatus being straight-forward, economical and efficient in its construction and in its operation.

Various other features of the present invention will become obvious to one skilled in the art upon reading the disclosure set forth hereinafter.

More particularly, the present invention provides a gas cleaner apparatus comprising a plurality of endless filter belts arranged to move in endless paths across a gas flow stream to be treated so that successive portions of each of the filter belts enter the gas flow stream at an entrance point, pass across it, then leave it an an exit point, the filter belts positioned with respect to each other to present a pleat type construction upstream of the gas flow stream, and means for moving the filter belts into and out of the gas flow stream.

It is to be understood that various changes can be made in the arrangement, form and construction of the apparatus disclosed herein without departing from the scope or spirit of the present invention.

Referring to the drawing which discloses one advantageous embodiment of the present invention:

FIGURE 1 is an elevational sectional view of a dust separator apparatus embodying the present invention;

FIGURE 2 is a sectional plan view taken in plane passing through line 2—2 of FIGURE 1, a portion of the structure of FIGURE 1 being omitted for purposes of clarity; and, FIGURE 3 is an enlarged perspective view of a portion of the apparatus of FIGURES 1 and 2 in partially cutaway form.

Referring to FIGURES 1 and 2 of the drawing, there is disclosed a substantially rectangular, vertically extending housing 2 having upstream gas inlet 3 and downstream gas outlet 4. Extending transverse across the upper and lower portions of housing 2 in spaced relationship from the roof and bottom wall respectfully thereof are spaced right angle structural members 6 and 7. The extremities of structural members 6 and 7 are fastened (in a manner not shown) by some suitable means, such as welding or riveting, to the side walls of housing 2. Fastened to and extending vertically between structural members 6 and 7 are spaced pleat forming filter media support members, broadly designated by reference numerals 8. Each pleat forming media support member includes gas impervious, opposed side flanks 9 and 11 and gas impervious, opposed top and bottom flanks 12 and 13, respectively. It is to be noted that side flanks 9 and 11 of each support member 8 fall in planes which converge downstream of housing 2 toward each other so that the pleated support members 8 have horizontal cross sections of truncated shape. Advantageously, the angle formed between the planes of the converging flanks should be approximately 45° and, at any rate, should not be less than 30° in order to minimize shock loss and to avoid excessive pressure drop during gas treating operations.

Each media support member 8 includes an upstream face 14 which is in the form of a foraminous screen so as to permit free flow of gas therethrough, the vertically extending sides of the upstream face being provided with media guide members 16. Fastened to and extending vertically between the right angle structural members 6 and 7, intermediate the downstream portion of the side flanks 9, 11 of support members 8, so as to offset from screens 14 along the line of gas flow are downstream foraminous screens 18. It is to be noted that not only are screens 18 offset from screens 14 along the line of gas flow of the gas flow stream to be treated, but, in addition, the screens 14 and 18 have overlapping side portions transverse such line of flow.

Rotatably mounted between the side walls of housing 2 immediately above and below right angle structural members 6 and 7 are horizontally extending roll pairs 21, 22 and 23, 24 respectively; the rolls of each pair being closely spaced to permit snug passage and compression therebetween of the hereinafter described endless filter belts of filter belt sets 26, 27. In the advantageous embodiment of the apparatus disclosed, the large roll 23 of the lower roll pair 23, 24 extends through one side of housing 2. A pinion gear 29 fixedly mounted on the extended portion of roll 23 meshes with gear 30 mounted on shaft 31 of a suitable drive motor 32. It is to be noted that the rolls of roll pair 23, 24 are spaced sufficiently close together to permit friction drive of the endless filter media belts of the belt sets 26, 27 passing therethrough and, at the same time, to compress such filter belts. It also is to be noted that roll 23 can be hollow and that the wall portion thereof can be provided with a plurality of spaced longitudinally disposed apertures 33. With such an arrangement, washing liquid can be passed through hollow roll 23 and apertures 33 onto the filter media belt of belt sets 26, 27 through a swivel connection with a suitable source of liquid supply (not shown), the bottom 28 of housing 2 being sloped downwardly to permit gravity drainage of such liquid from the belt into drain 25. Finally, it is to be noted that roll 21 of the upper roll pair 21, 22 also can be hollow and apertured for feeding filter treating liquid to the belts and that, if desired, the roll pair 21, 22 also can serve as a filter media drive and compression means.

The endless filter media belt sets 26, 27 which pass between roll pairs 21, 22 and 23, 24, advantageously can be of compressible, polyurethane material; however, it is to be understood that the present invention is not limited to such polyurethane material and that any one of a number of other well known filter media materials can be employed. The upstream flights of the endless belts of set 27 are arranged to pass over the upstream foraminous screens 14 of media support members 8, the belts being maintained in proper alignment during movement along screens 14 by guide members 16. In this connection, it is to be noted that housing 2 has pivotally mounted between its side walls, upper and lower horizontally extending guide members 38, 39. These guide members, which are shaped to include a plurality of parallel saddles, serve to maintain the downstream flights of endless belts of set 27 in proper position. It also is to be noted that guide members 38, 39 are spring loaded by suitable springs 40 connected between the free ends of the guide members and the side walls of housing 2 so that the belts of set 27 are maintained in taut position between the roller pairs and in sealing engagement against guides 16 to prevent any gas stream leakage or bypass around the belt sides, the belts of both sets 26 and 27 being of preselected length to further insure sealing engagement with their respective guides.

To further prevent a gas stream that is being treated from bypassing the filter belts of sets 26, 27, suitable sealing members are provided to cooperate with the roll pairs. These sealing members include strips 42 mounted and held in place between retainer bar 43 and support 6, the strip 42 being of some suitable material such as rubber to flexibly engage against roll 21. A similar strip 44 is similarly mounted on support 7, strip 44 flexibly engaging against roll 23. In like fashion, horizontally extending strips 46 and 47 are provided, strip 46 being mounted on the roof of housing 2 to flexibly engage against roll 22 and strip 47 being mounted to the bottom of housing 2 to flexibly engage against roll 24.

In a typical operation of the apparatus described, motor 32 is started to drive roll pair 23, 24 through the pinion gear 29, 30 arrangement aforedescribed, the roll 23 moving in a counterclockwise direction (FIGURE 1) so that the front flights of belt sets 26, 27 move downwardly over foraminous screens 16, 14 respectively. As the belts are moved along, the guides 16 and 38, 39 insure that the belts of set 27 follow their proper course. In like manner, the side flanks of support members 8 insure that the belts of set 26 follow their proper course. When the belts of sets 26 and 27 pass through roll pair 23, 24, a suitable supply of washing liquid can be supplied thereto through hollow roll 23 and apertures 33, the belts being compressed so that a portion of the liquid is caused to drain off through drain 25. If desired, a suitable filter treating liquid can be supplied to the belts through roll 21 and its apertures in order to enhance filtering operations as the front flights of the belts enter into the gas stream, the successive portions of each of the filter belts entering into the gas flow stream at an entrance point below the upper roll pair, pass across the gas flow stream and then leave it at an exit point above the lower roll pair.

With the arrangement abovedescribed, a dust filter apparatus is provided which continually presents a maximum of fresh filtering area to a gas stream to be treated and yet requires a minimum of space and offers a minimum of resistance to the treated gas stream. In addition, the arrangement affords a readily renewable filter medium in an apparatus which is straightforward, economical and efficient in its construction and operation.

The invention claimed is:

1. Gas cleaner apparatus comprising a plurality of endless filter belts arranged to move in spaced upstream and downstream flight paths across a gas flow stream so that successive portions of each of said filter belts enter said gas flow stream at an entrance point, pass across it and then leave it at an exit point, said filter belts being positioned with respect to each other to present a pleat type construction along said upstream flight paths, and means for moving said filter belts into and out of such gas flow stream.

2. Gas cleaner apparatus comprising a plurality of endless filter belts arranged to move in spaced upstream and downstream flight paths across a gas flow stream so that successive portions of each of said filter belts enter said gas flow stream at an entrance point, pass across it and then leave it at an exit point, successive filter belts being offset with respect to one another along the line of flow of the gas flow stream and having overlapping side portions transverse such line of flow to present a pleat type construction along said upstream flight paths, and means for moving said filter belts into and out of such gas flow stream.

3. Gas cleaning apparatus comprising a plurality of compressible endless filter belts arranged to move in spaced upstream and downstream flight paths across a gas flow stream so that successive portions of each of said filter belts enter said gas flow stream at an entrance point, pass across it and then leave it at an exit point, said filter belts being positioned with respect to each other to present a pleat type construction along said upstream flight paths, means for moving said filter belts into and out of such gas flow stream, liquid treating means for said filter belts, and compression means cooperable with said belts to remove a portion of the liquid with which said belts have been treated.

4. The apparatus of claim 3, said filter belt moving means including at least one pair of closely spaced feed rolls which serve as a compression means for removing a portion of the liquid.

5. The apparatus of claim 4, one of said feed rolls being hollow and having a plurality of spaced longitudinally disposed apertures, one end of said hollow feed roll being connected to a suitable source of treating liquid.

6. Gas cleaner apparatus comprising a plurality of endless filter belts arranged to move in spaced upstream and downstream flight paths across a gas flow stream so that successive portions of each of said filter belts enter said gas flow stream at an entrance point, pass across it and then leave it at an exit point, spaced foraminous support members positioned with respect to each other to present a pleat type construction along said upstream flight paths, and means for moving said filter belts over said foraminous support members into and out of such gas flow stream.

7. Gas cleaner apparatus comprising a housing having an upstream gas inlet and a downstream gas outlet defining a path for a gas flow stream to be treated, a plurality of endless filter belts disposed within said housing between said gas inlet and gas outlet means, said filter belts being arranged to move in spaced upstream and downstream flight paths across the gas flow stream so that successive portions of each of said filter belts enter said gas flow stream at an entrance point, pass across it and then leave it at an exit point, said filter belts being positioned with respect to each other to present a pleat type construction along said upstream flight paths, and means for moving said filter belts into and out of such gas flow stream.

8. Gas cleaner apparatus comprising a housing having an upstream gas inlet and a downstream gas outlet defining a path for a gas flow stream to be treated, a plurality of endless filter belts disposed within said housing between said gas inlet and said gas outlet, said filter belts extending transverse said gas flow stream and being arranged to move in spaced upstream and downstream flight paths thereacross so that successive portions of each of said filter belts enter said gas flow stream at an entrance point, pass across it and then leave it at an exit point, successive filter belts being offset with respect to one another along the line of flow of the gas flow stream and having overlapping side portions transverse such line of flow to present a pleat type construction along said upstream flight paths, and means for moving said filter belts into and out of such gas flow stream.

9. The apparatus of claim 8, and sealing means cooperating with said housing to prevent the bypass of gas around said belts.

10. Gas cleaner apparatus comprising a housing having an upstream gas inlet and a downstream gas outlet defining a path for a gas flow stream to be treated, a plurality of endless filter belts disposed within said housing between said gas inlet and said gas outlet, said filter belts extending transverse said gas flow stream and being arranged to move in spaced upstream and downstream flight paths thereacross so that successive portions of each of said filter belts enter said gas flow stream at an entrance point, pass across it and then leave it at an exit point, spaced foraminous support members extending adjacent said upstream flight paths of said endless belts, said endless belts being positioned with respect to each other in said housing to present a pleat type construction along said upstream flight paths, and means for moving said filter belts over said foraminous support members into and out of such gas flow stream.

11. The apparatus of claim 10, said foraminous support members having gas impervious side flanks extending downstream therefrom, the opposed side flanks of each pleat converging toward each other at an angle of not less than 30° to minimize shock loss and to avoid excessive pressure drop.

12. The apparatus of claim 11, the opposed side flanks converging toward each other at an angle of approximately 45°.

13. Gas cleaner apparatus comprising a plurality of endless filter belts arranged to move in spaced upstream and downstream flight paths across a gas flow stream so that successive portions of each of said filter belts enter said gas flow stream at an entrance point, pass across it and then leave it at an exit point, said filter belts being positioned with respect to each other to present a pleat type construction along said upstream flight paths, guide means for said filter belts to insure their movement along a predetermined path into and out of such gas flow stream, and means for moving said filter belts along such predetermined path.

14. The apparatus of claim 13, said guide means including a spring loaded member acting against said filter belts to maintain said belts in taut sealing position.

15. Gas cleaner apparatus comprising a housing having an upstream gas inlet and a downstream gas outlet defining a path for a gas flow stream to be treated, a plurality of endless filter belts disposed within said housing between said gas inlet and gas outlet, said filter belts extending transverse said gas flow stream and being arranged to move in spaced upstream and downstream flight paths thereacross so that successive portions of each of said filter belts enter said gas flow stream at an entrance point, pass across it and then leave it at an exit point, spaced support members extending adjacent said upstream flight paths of said endless belts, said endless belts being positioned with respect to each other in said housing to present a pleat type construction along said upstream flight paths, each of said support members including a foraminous upstream face and spaced guide rail members extending along the sides of said upstream face, and means for moving said filter belts over said foraminous faces of said support members between said guide rails into and out of such gas flow stream.

16. Gas cleaner apparatus comprising a housing having an upstream gas inlet and a downstream gas outlet defining a path for a gas flow stream to be treated, a plurality of endless filter belts disposed within said housing between said gas inlet and said gas outlet, said filter belts extending transverse said gas flow stream and being arranged to move in spaced upstream and downstream flight paths thereacross so that successive portions of each of said belts enter said gas flow stream at an entrance point, pass across it and then leave it at an exit point, successive filter belts being offset with respect to one another along the line of flow of the gas flow stream and having overlapping side portions transverse such line of flow to present a pleat tye construction along said upstream flight paths, successively offset, spaced upstream and downstream support members including foraminous faces cooperating with the upstream flights of said endless filter belts, said foraminous faces of said upstream support members having spaced guide rail members extending along the sides thereof and having side flanks extending downstream therefrom, the opposed side flanks of each upstream support member resting in planes converging downstream toward each other at an angle of not less than 30° to minimize shock loss and avoid excessive pressure drop, means for moving said filter belts into and out of the gas flow stream, liquid treating means for said filter belts, and sealing means cooperating with said housing to prevent bypass of said gas around said belts.

17. The apparatus of claim 16, said filter belt moving means including spaced roll pairs, the rolls of each pair being closely spaced with at least one pair of said roll pairs serving as belt feeding means and compression means, one of said feed rolls being hollow with the wall thereof having a plurality of spaced longitudinally disposed apertures, said hollow feed roll being connected to a suitable source of treating liquid.

18. Gas cleaner apparatus comprising a first set of filter media support members arranged in parallel spaced relationship, each of said first set of support members including an upstream gas pervious foraminous face and gas impervious pleat forming top, bottom and side flanks, a second set of filter media support members, including a set of gas pervious foraminous faces arranged in parallel, spaced relationship downstream and intermediate the side flank of said first set of support members, a first set of endless filter belts arranged to move in spaced upstream and downstream flight paths across a gas flow stream so that successive portions of each of said filter belts enter said gas flow stream at an entrance point, pass across it over a gas pervious foraminous face of said first set of filter media support members and then leave it at an exit point, a second set of endless filter belts arranged to move in spaced upstream and downstream flight paths across such gas flow stream so that successive portions of each of said filter belts of said second set enter said gas flow stream at an entrance point downstream of the entrance point of said first set, pass across it over a gas pervious foraminous face of said second set of filter media support members and then leave it at an exit point, said filter belts being positioned with respect to each other to present a pleat type construction along said upstream flight paths, and means for moving said belts into and out of such gas flow stream.

19. The apparatus of claim 18, said moving means including closely spaced roll pairs, one of said rolls of said pair being hollow with the wall thereof having a plurality of spaced, longitudinally disposed apertures, said hollow feed roll being connected to a suitable source of treating liquid.

References Cited in the file of this patent

UNITED STATES PATENTS

| | | |
|---|---|---|
| 1,814,855 | Robbins et al. | July 14, 1931 |
| 2,144,451 | Dollinger | Jan. 17, 1939 |
| 2,271,401 | Sainty | Jan. 27, 1942 |
| 2,792,907 | Replogle | May 21, 1957 |
| 2,869,680 | Fields | Jan. 20, 1959 |